Nov. 30, 1948.                    R. CASE                    2,455,228
                          TRANSPOSITION BRACKET
Filed March 14, 1947                                    2 Sheets-Sheet 1
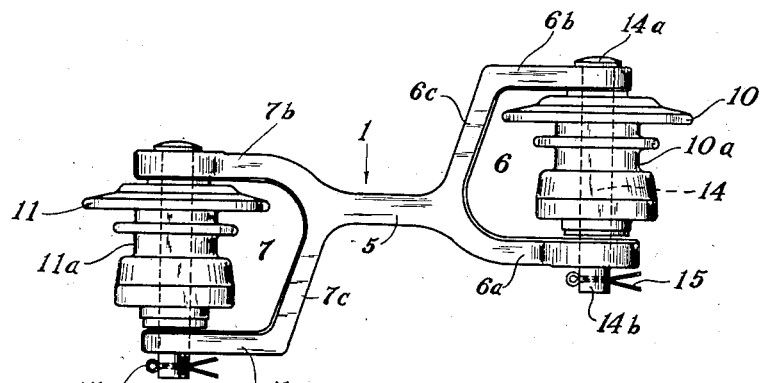
Fig. I
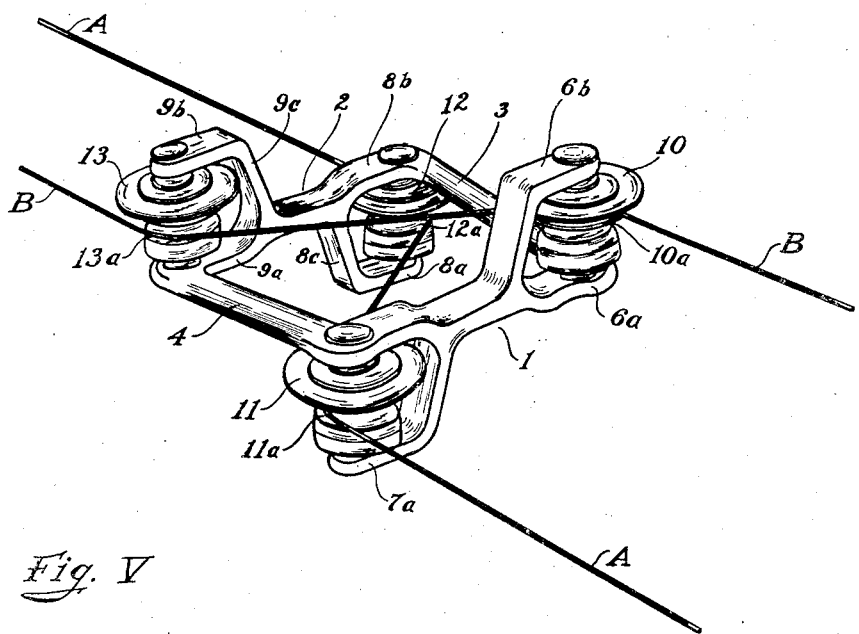
Fig. V
INVENTOR.
Rogers Case
BY
William B. Wharton
his attorney

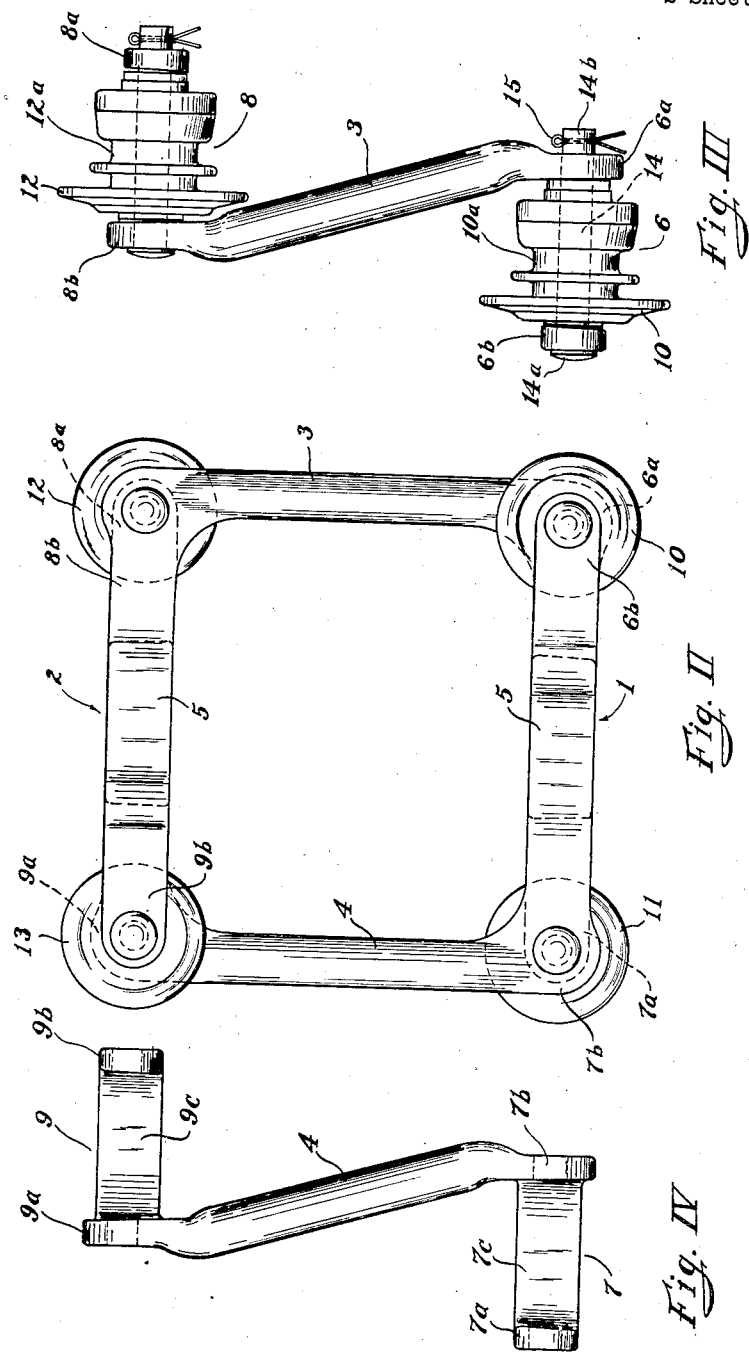

Patented Nov. 30, 1948

2,455,228

UNITED STATES PATENT OFFICE 2,455,228

TRANSPOSITION BRACKET

Rogers Case, Orange, N. J., assignor to Transadean Associates, Inc., New York, N. Y., a corporation of Delaware Application March 14, 1947, Serial No. 734,815

4 Claims. (Cl. 174—147)

This invention relates to wire-transposing and resistance-balancing devices applicable to parallel paired wires to change their positions relatively to each other at spaced intervals, and specifically to a wire-transposing bracket adapted to be mounted in suspended relation with the paired wires of a communication line which is an improvement on the bracket disclosed in my prior Patent No. 2,356,750.

The position-transposing and balancing device for paired wires disclosed in my said prior patent may be briefly defined as comprising a base, pairs of insulators mounted on opposite sides of the base in approximately rectangular arrangement, the said pairs of insulators on each side of the base respectively being located at diagonally opposed angles of the approximate rectangle formed by their arrangement cooperatively to receive by lateral insertion a continuously strung conductor wire trained thereon, and bracing means organized with the said insulators to support the insulators against the thrust of wires bearing thereagainst.

As in my prior patent, the primary objects of this invention are to provide a device for transposing and balancing paired wires carried by the wires themselves so that it may be positioned at any point along a transmission line; which is capable of installation of wires that are already strung without cutting the wires or disassembling the device; and which is arranged to afford adequate resistance to the crushing strain exerted by the wires tensioned upon such a device.

Specific objects of my invention are to provide increased convenience and strength in the means comprised in the bracket by which the insulators against which the wires bear are supported against the bending stresses exerted by the wires; to improve durability in the structural integration of the bracket; to provide a bracket which is of decreased weight without any sacrifice of strength, durability or utility; and to provide a frame structure so formed and arranged as to modify the spacing between wires crossed on the bracket by modifying the position of the bracket insulators in their opposite projection from the base of the frame as a median plane.

In service use of a bracket comprising the structural arrangement of my prior Patent No. 2,356,750, certain problems have been encountered in arriving at specialized forms of the bracket for particular service conditions, and one of such problems concerns itself with the weight of the bracket particularly as installed on wires in which there are long spans between poles or in which the stringing of the wires is such as to indicate that excessive sag will be caused by the imposition of any substantial weight intermediate the length of a span. Also the support and confinement of the insulators against which the wires bear has proven to be a matter of primary importance and the provision of such support by fixed, rigid and enduring structure has presented a serious service problem.

It is the growing tendency in communication installations to increase the length of spans between line poles and also to decrease the vertical spacing between line wires at transposition points from a previously general standard of an 8 inch spacing to a 6 inch spacing. As noted above, long spans between line poles, as well as any slack in the wires, tends to cause substantial sag if a bracket of unduly great weight be inserted in a span. While preserving the benefits of my prior patent in the opposite projection of the insulators in diagonal pairs from a common base plane, and while decreasing the overall weight of the bracket, it has become desirable so to mount the insulators as to obtain a desired spacing between the two line wires in the wire-receiving grooves of the insulators at the point of their transposition.

In accordance with my present invention I cast the frame structure of the bracket with a base which provides the plane from which the insulators of the bracket oppositely project. Cast of one-piece with that base are clevises arranged to open outwardly of the frame structure and forming elements of that structure. These clevises are arranged to mount the insulators in diagonal pairs oppositely projected from the plane of the base. The reaches of the frames between and including the clevises also are so formed and arranged as to regulate the vertical spacing of the crossed wires to a desired distance consistent with the form and arrangement of the insulators which are included in the bracket. The frame of the bracket desirably is cast from material of a sort to combine minimum weight with adequate tensile strength, such as a special steel, or more desirably one of the "light metals" such as aluminum, an alloy of aluminum, magnesium or a magnesium alloy.

In the accompanying drawings, illustrative of the embodiment of my invention:

Fig. I is an end elevation of the frame of the bracket.

Fig. II is a plan view of the assembled bracket, showing in outline insulators mounted in the clevises of the frame.

Fig. III is an elevation of one side of the bracket, looking toward that side.

Fig. IV is an elevation of the side of the bracket opposite the one shown in Fig. III looking toward that opposite side of that bracket and omitting the insulators.

Fig. V is a perspective view of the complete bracket, showing a pair of line wires trained thereon.

Referring to the accompanying drawings, the frame of the bracket consists primarily of end reaches 1 and 2 and side reaches 3 and 4. Each of the end reaches 1 and 2 has a plane portion 5 which defines the median, or base, plane of the frame. Looking to the right of the end reach 1 of the frame as it appears in Figs. I and II, the structure of the frame is deflected downwardly to form the lower fork 6a of a clevise 6 the upper fork 6b of which is connected by angularly extended leg 6c with the median base portion 5 of the reach. To the left of Figs. I and II the structure of end reach 1 of the bracket is deflected upwardly to provide the upper fork 7b of clevis 7 and the lower fork 7a of the clevis is joined with the median plane or base 5 of the reach by angularly extended leg 7c.

Clevises 8 and 9 bear respectively the same relation to the end reach 2 as do clevises 7 and 6 to end reach 1. Thus the lower fork 8a of clevis 8 is connected by an angularly extended leg 8c with the median or base portion 5 of end reach 2 and upper fork 8b of clevis 8 is deflected upwardly from the horizontal plane of that region. The upper fork 9b of clevis 9 is connected by angular leg 9c with the base portion 5 of end reach 2 and the lower fork 9a is deflected downwardly from that base plane.

Side reach 3 blends with the lower fork 6a of clevis 6 and the upper fork 8b of clevis 8 appearing to the upper right in Fig. II of the drawings. Side reach 3 is thus angularly disposed with respect to a horizontal plane, rising from the lower fork of clevis 6 to the upper fork of clevis 8, or conversely declining from the upper fork of clevis 8 to the lower fork of clevis 6.

Similarly, looking to the left of Fig. II the upper fork 7b of clevis 7 blends with side reach 4 which also is angularly disposed with respect to the horizontal plane of the bracket, declining from the upper fork of clevis 7 to the lower fork 9a of clevis 9, or conversely rising from the lower fork of clevis 9 to the upper fork of clevis 7.

Spool-form insulators 10, 11, 12 and 13 are mounted respectively in clevises 6, 7, 8 and 9. Desirably as is shown in the drawings, insulator pins 14 are of such form that the insulators are freely rotatable on them. These insulators which are of primarily spool-form and which may be composed of glass, porcelain, rubber, fiber or plastic composition or other material having suitable physical and electrical-insulating properties are carried each by its insulator pin 14 which has a head 14a resting on the upper fork of the clevis and a shank 14b which projects below the underfork of the clevis. Suitable means for engaging the insulator pin in the clevis in which it is mounted is shown as a cotter pin 15, but such engagement may be provided by means of a nut having threaded engagement with the projecting end of the pin or by any other suitable engagement.

In the arrangement of the insulators it will be seen that insulators 10 and 13 have their wire-receiving grooves 10a and 13a above the base, or median, plane of the bracket frame and that the wire-receiving grooves 11a and 12a of insulators 11 and 12 lie below the base, or median, plane of the frame. The wire-receiving grooves of all the insulators are equidistantly spaced a predetermined distance from that median plane.

It will be seen that the arrangement of the clevises and insulators mounted in them is diagonal. Thus the high clevises 6 and 9 are diagonally opposite each other in the bracket assembly and the low clevises 7 and 8 similarly are diagonally opposite each other. As viewed in the drawings, the high and low clevises, and insulators mounted in them are staggered relatively in the bracket. This arrangement conforms to the crossing of line wires within the bounds of the bracket frame. Together with the fact that all the clevises open outwardly of the frame structure, it conforms to the operation of mounting the bracket in suspended relation with the paired wires of a span and with the line wires transposed, without interrupting the span or disassembling the bracket.

In mounting the bracket on strung wires A and B in the position shown in Fig. V of the drawings the bracket is worked into position with respect to the wires by lateral insertion transposingly to cross the wires within the frame of the bracket. In such relation the wire A is shown trained on the low insulators 11 and 12 and the wire B is shown as trained on the high insulators 10 and 13. In their crossed relation the two wires are spaced vertically a distance equal to the distance between the wire-receiving grooves of the diagonal pair of high insulators and the wire-receiving grooves of the diagonal pair of low insulators, as for example the vertical distance between the wire-receiving grooves 10a and 11a in Fig. I of the drawings. Because the insulators are mounted in the clevises, the wires trained on the insulators in their wire-receiving grooves are confined within the clevises. There is therefore no likelihood that there will be a "floater," that is an upwardly escaped wire, if an insulator should be broken in service.

The entire frame structure of the bracket being a one-piece casting possesses in a very high order the properties of rigidity, strength and endurance. The clevises being integrated in the frame structure by casting, there are no bolts or rivets to shear or work loose in service and the insulator pins are supported in clevises which are free from spring or other relative movement between parts or regions of the structure. The insulator pins are thus well protected against the thrust of the line wires on the insulators which are mounted on them.

As to the vertical spacing between the line wires in their crossed relation, that vertical spacing is modified by deflecting the lower forks of each of the clevises for the high insulators slightly below the base plane of the frame and by elevating the upper forks of the clevises for the low insulators slightly above the base plane of the frame. This accommodation in the organization of the frame permits the use of insulators having a desirable structural contour while obtaining a desired spacing of the crossed wires. That is, a desirable form of insulator having been selected, the frame of the bracket can be cast to give a determined vertical spacing of the crossed wires while using insulators of the specific selected form, by casting the one-piece frame with the forks of its clevises deflected appropriate distances from the base plane of the frame.

If as is desirable the bracket is cast from one of the light metals or from some other metal such as a special steel which combines strength with lightness, it produces relatively slight sag of the line wires on which it is installed even though the spans of wire which carry the insulators extend long distances between line poles.

While the bracket frame in the embodiment of my invention herein illustrated and described is a one-piece casting, as is most desirable, it is to be understood that certain aspects of my invention remain even though the integration of the bracket frame be otherwise obtained. Also it is to be understood that other modifications in the form and arrangement of the bracket elements may be made within the bounds of my invention as defined in the appended claims.

I claim as my invention:

1. A wire-transposing bracket adapted for lateral insertion in a span of paired wires comprising a frame integrally cast from a "light" metal selected from the group consisting of magnesium, aluminum and their alloys and having two approximately parallel reaches terminally forked to provide in each such reach outwardly open insulator-mounting clevises oppositely offset from a median base plane, diagonally opposed clevises being similarly offset, two connecting reaches extended between the said terminally forked reaches with the ends of each connecting reach blended respectively with the upper fork of a clevis of one end reach and with the lower fork of a clevis of the other end reach, and spool-form insulators having circumferential wire-receiving grooves mounted in said clevises in diagonally aligned pairs both insulators of which have a common spacing from the median base plane of the frame, the lower fork of each upwardly offset clevis being downwardly deflected and the upper fork of each downwardly offset clevis being upwardly deflected to modify the spacing between the wire-receiving grooves of the two said diagonally aligned pairs of insulators.

2. A frame structure for a wire-transposing bracket adapted for lateral insertion in a span of paired wires said frame being integrally cast from a "light" metal selected from the group consisting of magnesium, aluminum and their alloys and having two approximately parallel reaches terminally forked at both ends of each to provide in each such reach two outwardly open insulator-mounting clevises oppositely offset from a median base plane, diagonally opposed clevises being similarly offset, and two connecting reaches extended between the said terminally forked reaches with the ends of each connecting reach blended respectively with the upper fork of a clevis of one end reach and with the lower fork of a clevis of the other end reach, the lower fork of each upwardly offset clevis being downwardly deflected and the upper fork of each downwardly offset clevis being upwardly deflected to modify the spacing between the insulator-mounting openings of the two said diagonally aligned pairs of clevises, and to modify the spacing between the wire-receiving grooves of two pairs of spool-form insulators mounted in said clevises with the two insulators of each such pair in diagonal alignment and uniformly spaced from the base plane of the frame structure.

3. A wire-transposing bracket adapted for lateral insertion in a span of paired wires comprising a frame having two approximately parallel end reaches terminally forked at both ends of each to provide in each such reach two outwardly open insulator-mounting clevises oppositely offset from a median base plane, diagonally opposed clevises being similarly offset, connecting reaches extended between the said terminally forked reaches with the ends of each connecting reach joined respectively with the upper fork of a clevis of one end reach and with the lower fork of a clevis of another end reach, and spool-form insulators having circumferential wire-receiving grooves mounted in said clevises in diagonally aligned pairs both insulators of which have a common spacing from the median base plane of the frame, the lower fork of each upwardly offset clevis being downwardly deflected and the upper fork of each downwardly offset clevis being upwardly deflected to modify the spacing between the wire-receiving grooves of the two said diagonally aligned pairs of insulators.

4. A frame structure for a wire-transposing bracket adapted for lateral insertion in a span of paired wires, said frame having two approximately parallel end reaches terminally forked at both ends of each to provide in each such reach two outwardly open insulator-mounting clevises oppositely offset from, a median base plane, diagonally opposed clevises being similarly offset, and connecting reaches extended between the said terminally forked reaches with the ends of each connecting reach joined respectively with the upper fork of a clevis of one end reach and with the lower fork of a clevis of anoher end reach, the lower fork of each upwardly offset clevis being downwardly deflected and the upper fork of each downwardly offset clevis being upwardly deflected to modify the spacing between the insulator-mounting openings of the two said diagonally aligned pairs of clevises, and to modify the spacing between the wire-receiving grooves of two pairs of spool-form insulators mounted in said clevises with the two insulators of each such pair in diagonal alignment and uniformly spaced from the base plane of the frame structure.

ROGERS CASE.

REFERENCES CITED

The following references are of record in the file of this patent:

UNITED STATES PATENTS

| Number | Name | Date |
| --- | --- | --- |
| 902,455 | Skinner | Oct. 27, 1908 |
| 1,840,362 | Hunter | Jan. 12, 1932 |
| 2,043,754 | Johnson | June 9, 1936 |
| 2,300,674 | Johns et al. | Nov. 3, 1942 |
| 2,356,750 | Case | Aug. 29, 1944 |